United States Patent [19]
Chiu et al.

[11] Patent Number: 5,214,503
[45] Date of Patent: May 25, 1993

[54] COLOR NIGHT VISION CAMERA SYSTEM

[75] Inventors: Yue T. Chiu, Eatontown; Philip F. Krzyzkowski, Red Bank; Richard P. Tuttle, Wall, all of N.J.

[73] Assignee: The United States of America as represented by the Secretary of the Army, Washington, D.C.

[21] Appl. No.: 828,616

[22] Filed: Jan. 31, 1992

[51] Int. Cl.$^5$ .................. H04N 9/097; H04N 5/33
[52] U.S. Cl. ....................... 358/50; 358/55; 358/211; 358/42; 250/331
[58] Field of Search .............. 358/211, 42, 113, 225, 358/50, 41, 55; 250/330-332

[56] References Cited

U.S. PATENT DOCUMENTS

| | | | |
|---|---|---|---|
| 2,686,219 | 8/1954 | Lindenblad . | |
| 2,724,737 | 11/1955 | Hogan . | |
| 2,929,866 | 3/1960 | Melamed | 358/211 X |
| 3,812,526 | 5/1974 | Tan | 358/42 |
| 4,086,616 | 4/1978 | Catano et al. . | |
| 4,589,030 | 5/1986 | Kley | 358/225 |
| 4,724,354 | 2/1988 | Dill | 358/42 X |
| 5,103,301 | 4/1992 | Cosentino | 358/42 |

OTHER PUBLICATIONS

Army RDGA Bulletin, May–Jun. 1988, pp. 6-9, by M. Zulovich.
Scientific American, Nov. 1981, pp. 67-71, by M. Lampton.
ESA Bulletin, Paper No. 1, vol. 24, No. 2, pp. 197-200 by J. A. Slusher.
Spike Proceedings, vol. 42, Aug. 27-29, 1973, pp. 3-13, by C. P. Freeman.

Primary Examiner—Mark R. Powell
Attorney, Agent, or Firm—Michael Zelenka; William H. Anderson

[57] ABSTRACT

A camera system providing color night vision for use in reconnaissance, or the like. The system includes a first lens, a mirror subassembly for splitting the lens image into three images, a filter subassembly for respectively filtering the three images through a red filter and a green filter and a blue filter first and second and third intensifiers having respective first and second and third camera units which view the three images and send three image signals in series to a display monitor where the color image is viewed.

1 Claim, 2 Drawing Sheets

5,214,503

COLOR NIGHT VISION CAMERA SYSTEM

GOVERNMENTAL INTEREST

The invention described herein may be manufactured, used, and licensed by or for the Government for governmental purposes without the payment to us of any royalty thereon.

FIELD OF THE INVENTION

This invention relates in general to an a camera system, and in particular to a color night vision camera system, having a plurality of mirrors for splitting a received image into three images, red and green and blue filters respectively receiving the images, and three cameras with intensifiers respectively receiving the filtered images for transmission to a monitor.

BACKGROUND OF THE INVENTION

The prior art night vision camera system is described in the publication, Army Research, Development and Acquisition Bulletin, U.S. Army Material Command, 5001 Eisenhower Avenue, Alexandria, VA 22333-0001, May-June 1988, "Image Intensification Technology", by Mavis DeZulovich, pages 6 through 9. Related publications include:

A) Scientific American, November 1981, "The Microchannel Image Intensifier", by Michael Lampton, pages 67 through 71.

B) ESA Symposium, Paper Number 1, "Night Vision Equipment Developments: Where We've Been, Where We Are Today, and Where We're Going, by Jeffrey A. Slusher, ESA Bulletin, Vol. 24, No. 2, 1978, pages 197 through 200.

C) Proceedings of the Society of Photo-Optical Instrumentation Engineers, Image Intensifiers: Technology, Performance, Requirements and Applications, Volume 42, Aug. 27-29, 1973, "Image Intensifier Tubes", by Charles P. Freeman.

The prior art night vision camera system includes a lens, and an image intensifier, which has a photocathode plate and a microchannel plate and a phosphor screen.

One problem with the prior art night vision camera system is that it does not perform as a color night vision camera system.

SUMMARY OF THE INVENTION

According to the present invention, a color night vision camera system is provided. This system includes a lens which outputs an image along a lens light path, mirror means which receives the lens image and which outputs first and second and third images along respective first and second and third mirror paths, a red filter and a green filter and a blue filter which receive respectively the first and second and third mirror images and which output respectively first and second and third filtered images, image intensifier means which receives the first and second and third filtered images and which outputs first and second and third intensified images, camera means which receives the first and second and third intensified images and which has first and second and third conductors for respectively outputting first and second and third camera signals representing respectively first red and second green and third blue camera images to a red and green and blue signal monitor.

By using the mirror means and filter means and camera means and a monitor, an effective color night vision camera system is provided.

An object of the present invention is to provide a color night vision camera system.

Another object is to provide a color night vision camera system for use in reconnaissance and like activities.

A further object is to provide a color night vision camera system, which is simple to fabricate, and which is relatively inexpensive to build, and which is easy to maintain, and which uses commercially available parts.

BRIEF DESCRIPTION OF THE DRAWINGS

These and other objects, features, and details of the invention will become apparent in light of the ensuing detailed disclosure, and particularly in light of the drawings wherein.

DETAILED DESCRIPTION

Figure 1:
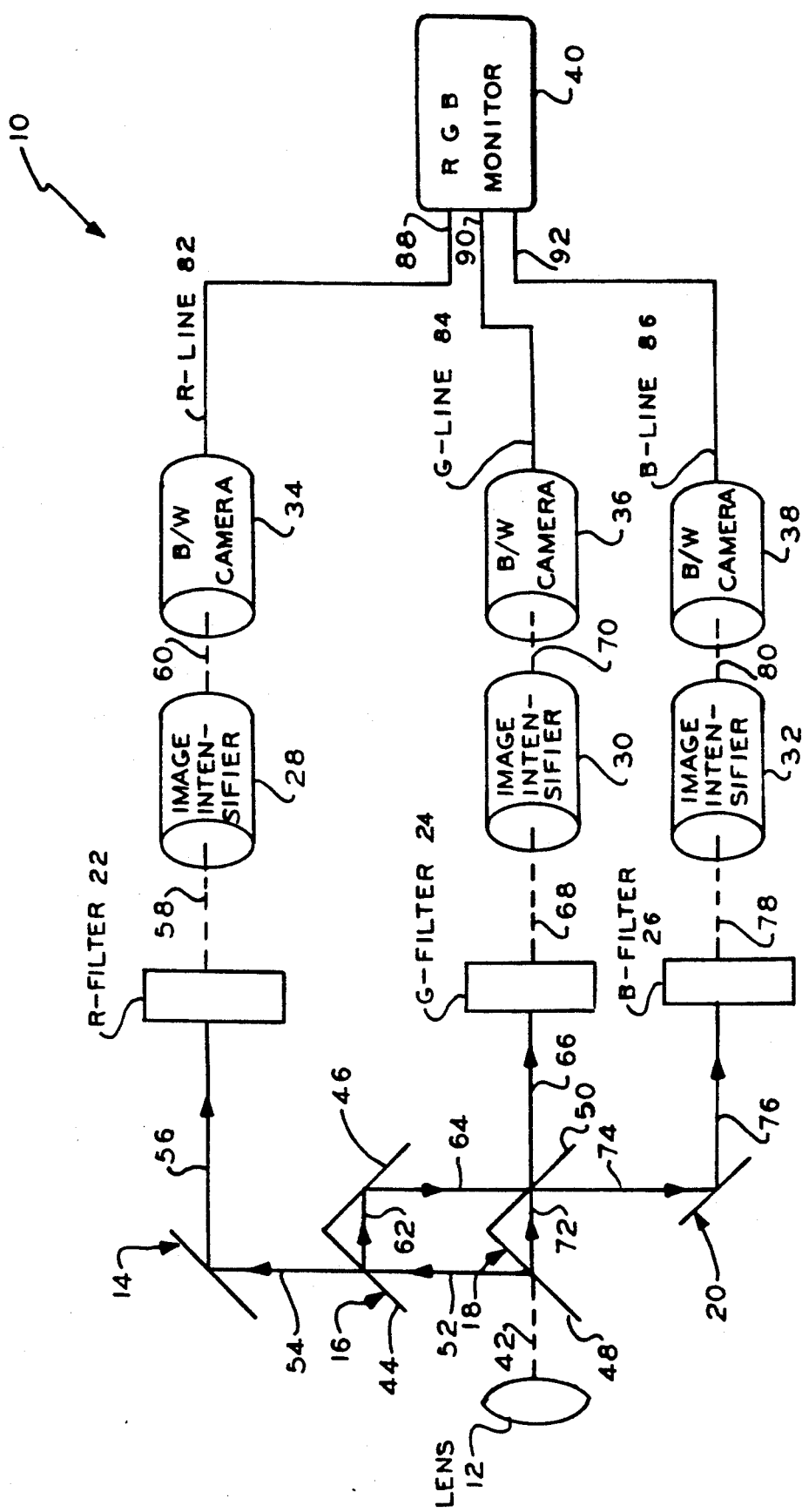
FIG. 1 is a schematic block diagram of a color night vision camera system, according to the present invention.

As shown in FIG. 1, a camera system or an optical apparatus or a color night vision camera system 10 is provided. System 10 includes a lens 12, a first or top planar mirror 14, a second or partly reflective upper L-shaped mirror 16, a third or partly reflective lower L-shaped mirror 18, and a fourth or bottom planar mirror 20. System 10 also has a first top red filter or R-filter 22, a second middle green filter or G-filter 24, and a third bottom blue filter or B-filter 26. System 10 also has a first top image intensifier 28, a second middle image intensifier 30, and a third bottom image intensifier 32. System 10 also has a first top black and white camera or B/W camera 34, a second middle black and white camera or B/W camera 36, and a third bottom black and white camera or B/W camera 38. System 10 also has a red and green and blue (RGB) monitor 40.

Lens 12 has an output light path or lens path 42 for an output image. Second upper mirror 16 has left and right leg or wall portions 44, 46. Third lower mirror 18 has left and right leg portions or wall portions 48, 50.

Lens path 42 has an output image. The image is split into first and second and third images by mirrors 16, 18. The first mirror image travels along path 52 from mirror portion 48, then along path 54 from mirror portion 44, then along path 56 from top mirror 14, then along image path 58 from R-filter 22, then along image path 60 from image intensifier 28 to B/W camera 34.

The second mirror image travels along path 52 from wall 48, then along path 62 from wall 44, then along path 64 from wall 46, then along path 66 from wall 50, then along path 68 from G-filter 24, then along path 70 from intensifier 30 to B/W camera 36.

The third mirror image travels along path 72 from wall 48, then along path 74 from wall 50, then along path 76 from mirror 20, then along path 78 from B-filter 26, then along path 80 from intensifier 32, to B/W camera 38.

Camera 34 has an output red conductor or R-line 82. Camera 36 has an output green conductor or G-line 84. Camera 38 has an output blue conductor or B-line 86. Lines 82, 84, 86 at one end connect as respective outputs of cameras 34, 36, 38. Lines 82, 84, 86 at their opposite end connect to respective inputs 88, 90, 92 of monitor 40.

Lens 12, and mirrors 14, 16, 18, 20, and filters 22, 24, 26, and intensifiers 28, 30, 32, and cameras 34, 36, 38, and monitor 40, are each individual conventional components.

In operation, system 10 functions as an image splitter, splitting the image from the lens 12 into three identical images, in terms of the image size or equal path length, orientation and spectral content, to the RGB filters, 22, 24, 26. These optical filters 22, 24, 26 are bandpass, low and high pass filters separating the three identical images into images with different spectral components (i.e. the image following the R filter contains spectral information from about 620 to 700 nm, similarly from about 510 to 620 nm for the B filter and centered about 500 nm for the G filter. After amplitude amplification through the image intensifier 28, 30, 32, each camera 34, 36, 38 then converts each of the spectrally different images into the respective RGB signals to the RGB monitor 40 for display. With proper selection of the filters 22, 24, 26 and proper adjustment to each of the signal amplitudes, a close-to-true color image can be produced on the monitor 40.

During operation, system 10 views optical images under full moonlight ($10^{-2}$ ft-L) to starlight ($10^{-4}$ ft-L) ambients. Color monitor 40 provides color images and requires the availability of three video signals, namely red (R), green (G), and blue (B) color signals. These three signals are extracted from the low-level-light image, so that the monitor 40 provides night vision images in color. System 10 spectrally separates the low-level image, enhances or image intensifies, and converts individually to the signals required for the monitor 40.

System 10, will accept a very low light ambient optical image, or other spectral imagery that can be suitably up-converted to the photopic spectrum, and makes use of available technology and hardware to produce a color or pseudo-color video image that can be displayed on a color CRT or flat panel. System 10 combines the use of a B/W TV camera 34, 36, 38, image intensifier 28, 30, 32, spectral filters 22, 24, 26, and optics 14, 16, 18, 20 to provide real or pseudo-color video displays of night vision imagery. System 10 provides indirect and remote viewing or viewing at a display device, as opposed to direct viewing at the image intensifier.

System 10 involves the use of photopic or other spectrally selected optical filters to separate the image spectrum into three separate spectral regions, image intensifying/amplifying the spectral selected image portion and converting them to electrical signals using a B/W camera. The three resultant signals as functions of the optical filters, 22, 24, 26 are applied to a Red/Green/Blue (RGB) CRT monitor 40 or appropriate display device. System 10 when applied to the visible spectrum (450–650 nanometers) can provide close-to-true color-images with proper selection and balancing of the filters, and with proper adjustment of each signal amplitude to the display.

Figure 2:
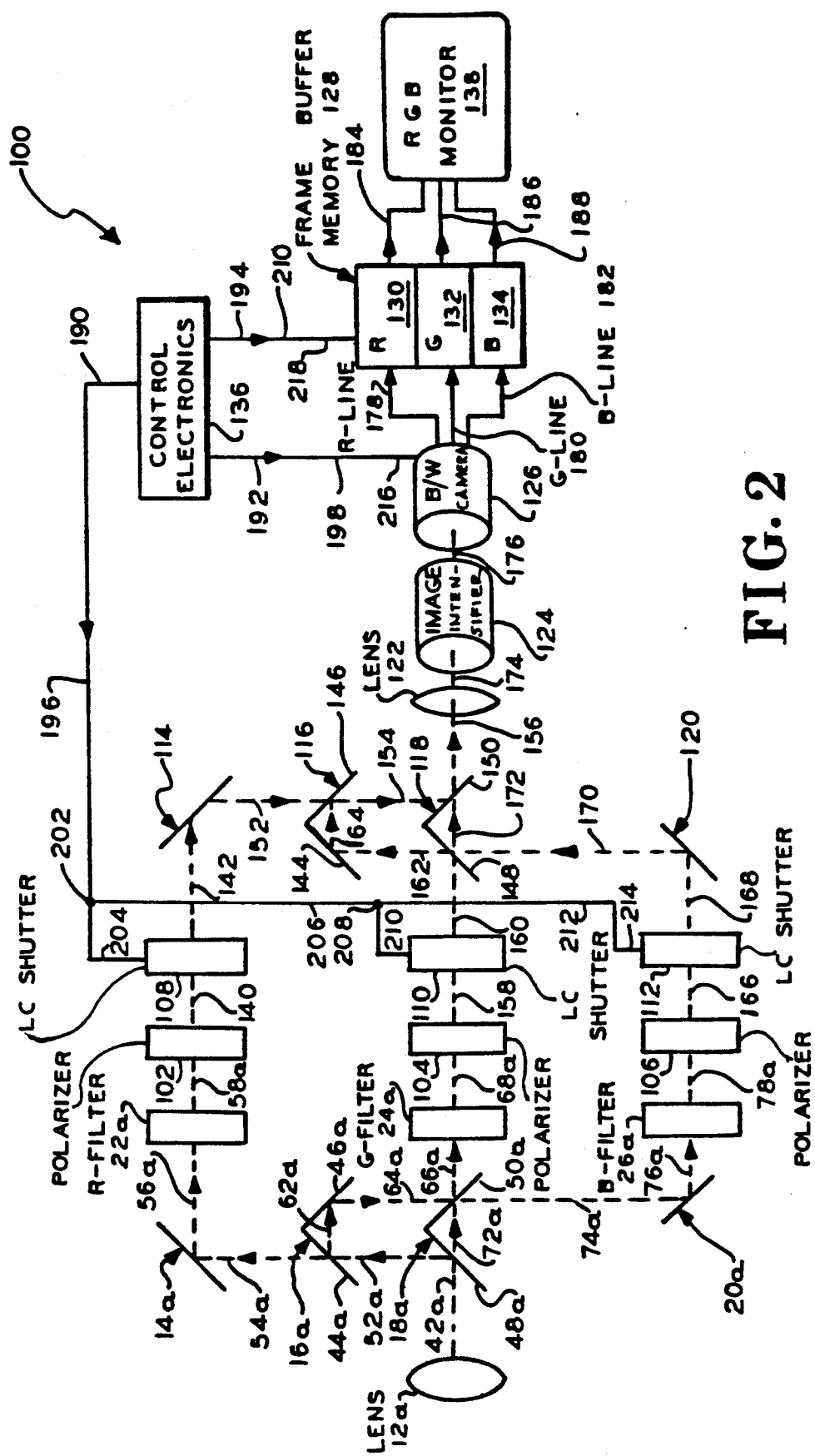
FIG. 2 is a schematic block diagram of a second embodiment of the color night vision camera system.

As shown in FIG. 2, a second embodiment or system 100 is provided. Parts of second embodiment 100 which are similar to corresponding parts of first embodiment 10, have the same numerals, but with a subscript "a" added thereto.

System 100 has a lens 12a, a first mirror 14a, a second mirror 16a, a third mirror 18a, and a fourth mirror 20a. System 100 has a first filter 22a, a second filter 24a, and a third filter 26a, which are respectively aligned with respective first, third and fourth mirrors 14a, 18a, 20a. System 100 has a first polarizer 102, a second polarizer 104, and a third polarizer 106, which are respectively aligned with filters 22a, 24a, 26a. System 100 has a first LC shutter 108, a second LC shutter 110, and a third LC shutter 112, which are respectively aligned with polarizers 102, 104, 106. System 10 has an opposite hand mirror subassembly which includes fifth mirror 114, a sixth mirror 116, a seventh mirror 118, and an eight mirror 120. System 100 also has an aligned second lens 122, an image intensifier 124, and a B/W camera 126. System 100 also has a frame buffer memory 128, which has a red or R-portion 130, and a green or G-portion 132 and a blue or B-portion 134. System 100 also has a control electronics unit 136, and a RGB monitor 138.

Lens 12a has a lens image path 42a. Second mirror 16a has mirror wall portions 44a, 46a. Third mirror 18a has mirror wall portions 48a, 50a.

A first image, after splitting, travels along path 52a from mirror wall 48a, then along path 54a from mirror wall 44a, then along path 56a from mirror 14a, then along path 58a from filter 22a, then along path 140 from polarizer 102, and then along path 142 from LC shutter 108. Sixth mirror 116 has mirror wall portions 144, 146. Seventh mirror 118 has mirror wall portions 148, 150.

First image continues to travel along path 152 from mirror 114, then along path 154 from mirror wall 146, and then along path 156 from mirror wall 150 to second lens 122.

A second image travels along path 52a from mirror wall 48a, then along path 62a from mirror wall 44a, then along path 64a from mirror wall 46a, then along path 66a from mirror wall 50a, then along path 68a from filter 24a, then along path 158 from polarizer 104, then along path 160 from LC shutter 110, then along path 162 from mirror wall 148, then along path 164 from mirror wall 144, then along path 154 from mirror wall 146, and then along path 156 from mirror wall 150 to second lens 122.

A third image travels along path 72a from mirror wall 48a, then along path 74a from mirror wall 50a, then along path 76a from mirror 20a, then along path 78a from filter 26a, then along path 166 from polarizer 106, then along path 168 from LC shutter 112, then along path 170 from mirror 120, then along path 172 from mirror wall 148, then along path 156 from mirror wall 150 to second lens 122.

The first and second and third images then travel along path 174 from second lens 122, then along path 176 from intensifier 124. The three images travel in sequence.

A first image signal travels along conductor R-line 178. A second image signal travels along conductor G-line 180. A third image signal travels along conductor B-line 182 from B/W camera 126.

A first image signal travels along conductor 184, and a second image signal travels along conductor 186; and a third image signal travels along conductor 188. Conductors 184, 186, 188 respectively extend from memory portions 130, 132, 134 of memory 128 to monitor 138.

Control electronics unit 136 has a first output 190, a second output 192, and a third output 194. Outputs 190, 192, 194 have respective conductors 196, 198, 200. Control 136 connects through conductor 196 and a circuit junction 202 to an input 204 of LC shutter 108. Control 136 connects through conductor 196, junction 202, a conductor 206, and a junction 208 to an input 210 of LC shutter 110. Control 136 also connects through conductor 196, junction 202, conductor 206, junction 208, a conductor 212, to an input 214 of LC shutter 112. Therefore, all the LC shutters 100, 110 and 112 operate simultaneously.

Control electronics unit 136 connects through output 192 and conductor 198 to an input 216 of camera 126. Control 136 also connects through output 194 and conductor 210 to an input 218 of memory 128.

In operation, system 100 samples the imagery at one third the conventional display rate ($\frac{1}{3} \times 60$ Hz for each field of the spectral images or 180 Hz.) and allows the spectral selected image to be sampled to a non-interlaced mode. The frame buffer 128 allows the required CRT monitor signals to be properly formatted. The images at each of the RGB filters 22a, 24a, 26a are identical in terms of the image size and orientation, but contain different spectral content. The polarizers 102, 104, or 106 and the LC shutters 108, 110, 112 at each of the RGB filter outputs function as optical switches switching on and off to allow light to go through at certain time intervals as controlled by the switch electronics. The timing of the switching is such that it cycles through each of the red and green and blue (RGB) light paths to allow each light to go through one at a time with equal duration so that after going through the various mirrors or reflectors to the image intensifier 124, the light becomes a series of continuous sequence of RGB images. The switching time for each LC shutter is set in such a way that it synchronizes with the camera so that during each interval the B/W camera converts only one of the RGB images into electrical signal and outputs it to the respective RGB frame memory for storage. The frequency for each LC shutter can be set at 60 Hz with a temporarily programmed 33% duty cycle, and if a 180 Hz camera is used, then each frame memory will be updated at 60 Hz. The monitor 138 can then receive the RGB signals at 60 Hz from each portion of the frame memory to provide a flicker-free display without the need of a scan converter.

Advantages of systems 10 and 100 are indicated hereafter.

A) Each system 10, 100 has a simple and inexpensive way of separating the three spectral images.

B) Each system 10, 100 provides ease of changing different filters.

C) Each system 10, 100 provides color night vision video images on a color monitor.

D) Each system 10, 100 uses a black-and-white camera and uses an image intensifier, which is a novel subassembly in such a system.

While the invention has been described in its preferred embodiments, it is to be understood that the words which have been used are words of description rather than limitation and that changes may be made within the purview of the appended claims without departing from the true scope and spirit of the invention in its broader aspects.

For example, a system can be provided which uses a prior art three color filter wheel rotating at 20 rps in place of the mirrors and reflectors, polarizers and the LC shutters. This allows each spectral image to be sampled at 60 Hz. rate in a non-interlaced mode with an ordinary B/W camera operating at 60 Hz rate. A frame buffer is necessary to format the color signals for the color display device. To avoid flicking due to the low 20 Hz. output rate of the three spectral images, a first frame buffer can be used to output the three spectral image signals coincidentally for successive read outs while a second frame buffer is loading the spectral images at 60 Hz.

As another example, a system can be provided for operation in the Infra-Red (IR) spectrum (650 to 950 nanometer) region. Prior art image intensifiers cover the visible and near IR region; or cover only the Near IR (600 to 950 nanometer) region and are very applicable as they have higher gain. The IR image is spectrally separated into three spectral bandwidths. The wavelength regions are up-converted at the visible region, which depends on Intensifier phosphor used, generally the P-20 green. The photopic output is sampled in relation to the spectral filter used for the three (RGB assigned) signals for the color display. The use of a white phosphor (P-4) would optimize the image intensifier and reduce the signal processing that is necessary with the P-20 phosphor.

As a further example, a system can be provided for operation in longer wavelength spectral regions, other than the visible region. When used in the infrared (IR) region, the RGB filters can be replaced by filters in the IR region. In this region, since there is a lack of defined "R", "G" or "B" filters, the choice of the types of IR filters, besides the gain adjustment of the signals, can have significant effect on the display output color, as the fact that the reflectivity curve in the two regions (the visible and the IR region) can be significantly different for different objects. The reflectivity of dark green paint for example is very different from that of green vegetation. Dark green paint has a fairly flat reflectivity over the two regions whereas green vegetation is different in orders of magnitude in the two regions. As such, the choice of filter types maybe dependent on the image content. True color may be difficult to obtain in the IR region, the system nevertheless can provide pseudocolor night video images. Furthermore, true color may not necessarily provide the best result. It can be application dependent. In a situation where the application is in military reconnaissance and surveillance, for example, pseudocolor may prove to be more desirable than true color, i.e. picking out a dark green military vehicle in the middle of a forest.

As a still further example, other optical spectral separation systems, i.e. double dichroic mirrors/prisms in place of the mirrors/reflectors and RGB filters, can be used which may result in a more rugged and compact system.

What is claimed is:

1. A color night vision camera system comprising:
a first lens which outputs an image along a lens light path;
a first mirror means which receives the lens image and which outputs first and second and third mirror images along respective first and second and third mirror paths;
a first red filter and a second green filter and a third blue filter which respectively receive the first and second and third mirror images and which respectively output first and second and third filtered images along first and second and third paths;
intensifier means which receives the first and second and third filtered images and which outputs first and second and third intensified images;
camera means which receives the first and second and third intensified images and which outputs respective first and second and third camera signals corresponding thereto;

monitor means which receives the first and second and third camera signals and displays a color night vision image;

wherein the first and second and third filters respectively have first and second and third polarizers and first and second and third LC shutters which act as optical switches that allow light to pass therethrough one at a time to the first and second and third paths therefrom;

second mirror means which receives the respective first and second and third shuttered and filtered images and which outputs one continuous image sequence therefrom;

a second lens which receives the image sequence from the mirror means; and wherein the intensifier means is a single intensifier unit which receives the image sequence from the second lens; and wherein the camera means is a single camera unit which receives the image sequence from the single intensifier unit, said single camera unit having a first red conductor and a second green conductor and a third blue conductor which output respective camera signals therefrom;

a frame buffer memory having a first red buffer portion and a second green buffer portion and a third blue buffer portion which respectively receive the signals from the first and second and third camera conductors and which respectively have first and second and third memory conductors that output respective memory signals to the monitor means; and a control electronics unit having a first control conductor connected to the camera unit and having a second control conductor connected to the frame buffer memory and having a third control conductor connected separately to each of the shutter units.

* * * * *